(12) United States Patent
De Zwart et al.

(10) Patent No.: US 8,208,011 B2
(45) Date of Patent: Jun. 26, 2012

(54) STEREOSCOPIC DISPLAY APPARATUS

(75) Inventors: Siebe Tjerk De Zwart, Eindhoven (NL);
Oscar Hendrikus Willemsen, Eindhoven (NL); Martin Gerard Hendrik Hiddink, Eindhoven (NL); Robert-Paul Mario Berretty, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 1164 days.

(21) Appl. No.: 12/063,859

(22) PCT Filed: Aug. 17, 2006

(86) PCT No.: PCT/IB2006/052840
§ 371 (c)(1), (2), (4) Date: Feb. 15, 2008

(87) PCT Pub. No.: WO2007/020600
PCT Pub. Date: Feb. 22, 2007

(65) Prior Publication Data
US 2008/0225114 A1    Sep. 18, 2008

(30) Foreign Application Priority Data
Aug. 19, 2005  (EP) .................................. 05107636

(51) Int. Cl.
*H04N 13/00* (2006.01)
(52) U.S. Cl. ........... 348/51; 348/54; 348/59; 348/222.1; 359/463

(58) Field of Classification Search ............... 348/51, 348/54, 59, 222.1; 359/463
See application file for complete search history.

(56) References Cited

U.S. PATENT DOCUMENTS

| 6,064,424 A | 5/2000 | Van Berkel et al. |
| 6,069,650 A * | 5/2000 | Battersby .................. 348/59 |
| 6,118,584 A * | 9/2000 | Van Berkel et al. .......... 359/463 |
| 6,859,240 B1 | 2/2005 | Brown et al. |
| 2003/0076423 A1* | 4/2003 | Dolgoff .................... 348/222.1 |

FOREIGN PATENT DOCUMENTS

| WO | 0162014 A2 | 8/2001 |
| WO | 2004049262 A1 | 6/2004 |
| WO | 2006117707 A2 | 11/2006 |

OTHER PUBLICATIONS

Janusz Konrad, et al: Artifact Reduction in Lenticular Multiscopic 3-D Displays by Means of Anti-Alias Filtering, IS&T/SPIE Image Video Comunications and Proceedings, Jan. 20-24, 2003, pp. 1-12.

* cited by examiner

Primary Examiner — Yves Dalencourt

(57) ABSTRACT

A method of computing a display value to be provided to a stereoscopic display apparatus (150) is described. The method includes: determining a first intermediate value (811) from a 3-D representation on basis of a first one of the angular directions and coordinates of a first one of the picture elements (102); determining a second intermediate value (810) from the 3-D representation on basis of a further angular direction relative to the first plane and the coordinates of the first one of the picture elements; and combining the first intermediate value (811) and the second intermediate value (810) to the display value, the display value related to the particular output of a first one of the picture elements of the stereoscopic display apparatus (102).

9 Claims, 15 Drawing Sheets

Figure 1:
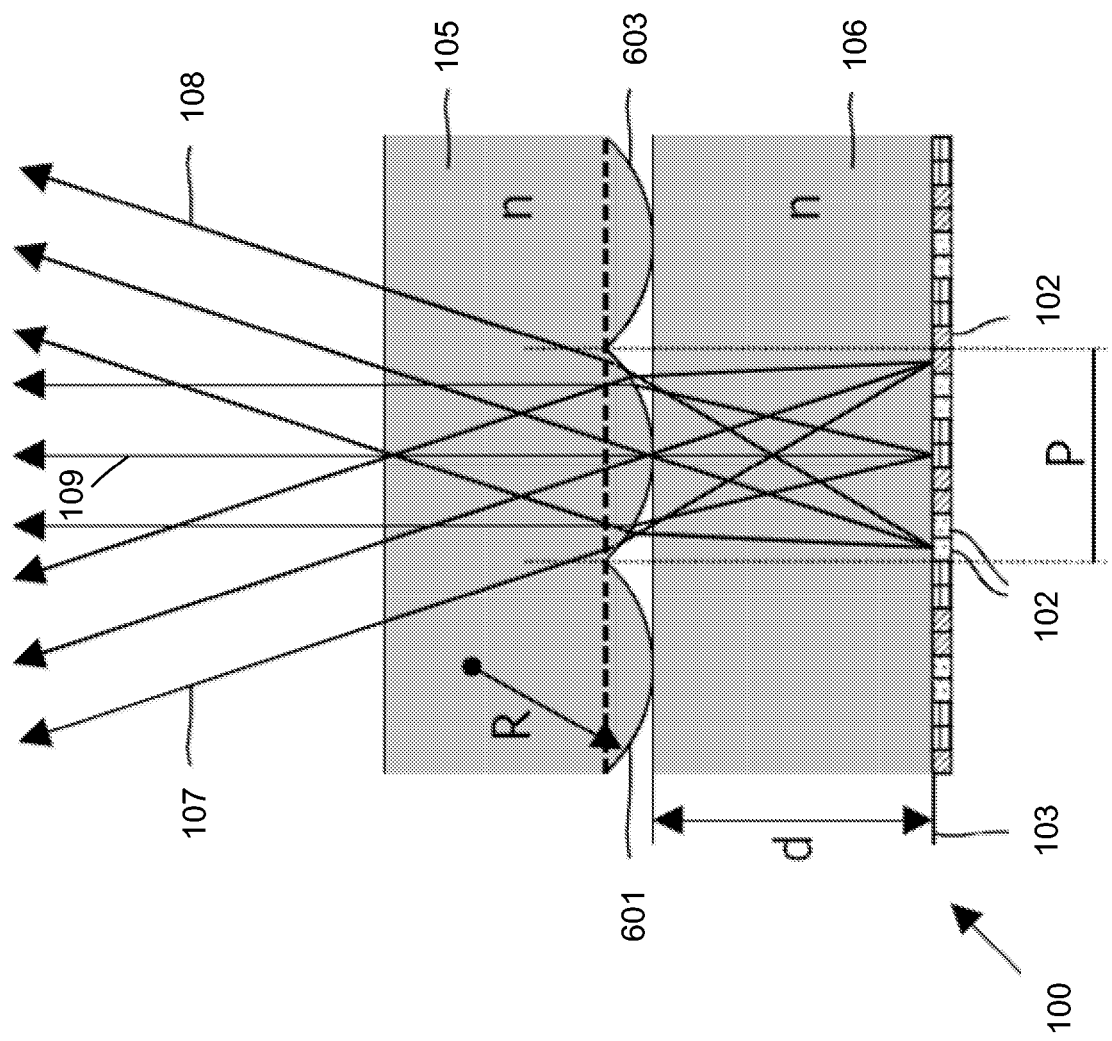

Input image:

disparity =4 pixels/view disparity =2 pixels/view

Simulated 3D images: disparity =0

STEREOSCOPIC DISPLAY APPARATUS

The invention relates to a stereoscopic display apparatus comprising means for producing a display, the stereoscopic display apparatus comprising laterally separated picture elements in a first plane and optical directory means comprising a group of optical directory elements each of which is associated with a respective group of picture elements, the optical directory means overlying the picture elements in the first plane for directing the outputs of the picture elements in mutually different angular directions relative to the first plane.

The invention further relates to a method of computing a display value to be provided to such a stereoscopic display apparatus.

The invention further relates to a computer program product to be loaded by a computer arrangement, comprising instructions to compute a display value to be provided to such a stereoscopic display apparatus Stereoscopic display apparatuses of the kind described in the opening paragraph are increasingly used both in hand held applications like telephones and in (TV) monitors, where multiple views are used.

The picture elements may correspond to single pixels, such as in monochrome devices, but generally (color-devices) correspond to sub-pixels of a color picture element.

A stereoscopic display apparatus of the kind mentioned above is described in U.S. Pat. No. 6,064,424, which shows an active matrix liquid crystal display panel having picture elements arranged in groups of picture elements and a lenticular screen having (cylindrical) lenticular elements, or lenticulars, as optical directory elements overlying the display panel. The light of each picture element is sent into different well-defined directions depending on the position of the picture element with respect to the lenses. In this way typically six independent views are created corresponding to six different viewing angles. A viewer receives different views in each eye and, when using the proper image content, observes a three-dimensional image.

Each lenticular in U.S. Pat. No. 6,064,424 is associated with a group of picture elements. The lenticulars are slanted with respect to the vertical column directions, which is favorable with regard to the perceived three-dimensional pixel structure.

For a viewer however due to the fact that different parts of the display reach the viewer's eye under different angles an intensity modulation on the display still occurs, referred to as "dark bands". The bands "shift" over the display as the viewer moves parallel to the display and the pitch of the bands changes as the viewer moves towards the display or away from the display. Even with a small modulation depth (e.g. only 1%) the effect is very annoying.

The applicant filed an application disclosing an invention to overcome at least partly said intensity modulation on Apr. 29, 2005 at the European patent office with application number 05103555.8. Basically, that application discloses that the dark bands are prevented by certain combinations of the slant angle and the lens pitch. The provided solution is called "fractional views". That invention is based on the understanding that the above mentioned modulation as a function of viewing angle, which is caused by the presence of non-emitting areas (black matrix) around the (LCD) picture elements, which are "imaged" into certain—hence darker—directions is overcome by choosing a design in which simultaneously both "full" (virtual) sub-pixels and "partial" (virtual) sub-pixels are imaged, leading to intensity modulations, which are mutually shifted in phase (e.g. 180° for k=2). As a result, the first harmonic of the total intensity cancels out and only a much less intense second harmonic (and third etc.) remains. The dark band effect is reduced accordingly.

However, if objects with a relatively large depth or disparity are rendered in a straightforward way, the display will suffer from so-called jagged edges. These repetitive patterns result into unnatural sharp features to e.g. objects far in the background, which are normally somewhat blurred.

It is an object of the invention to provide a method of the kind described in the opening paragraph whereby the occurrence of these so-called jagged edges is at least partly prevented.

This object of the invention is achieved in that the method comprises:

determining a first intermediate value from a 3-D representation on basis of a first one of the angular directions and coordinates of a first one of the picture elements;

determining a second intermediate value from the 3-D representation on basis of a further angular direction relative to the first plane and the coordinates of the first one of the picture elements; and combining the first intermediate value and the second intermediate value to the display value, the display value related to the particular output of the first one of the picture elements.

The inventors have observed that the artifacts occur if during the rendering, i.e. the computation of the display value a strict correspondence between the first intermediate value from the 3-D representation, the first one of the angular directions and the coordinates of the first one of the picture elements is maintained. In other words, the artefacts occur if the computation of the display value is solely based on the first intermediate value, which is the correct approach for most rendering methods. Basically, the method according to the invention is based on low-pass filtering in the 3-D representation. Because of the multiple intermediate values each based on respective angular directions but all related to the same coordinates of the first one of the picture elements the amount of filtering is dependent on the depth (disparity) of the object to be displayed. Objects which are to be displayed in the first plane (or relatively close to the first plane) are not or hardly blurred, while for other objects of the 3-D representation which are to be displayed further away from that first plane the amount of blur is higher.

Although low-pass filtering as such is a known technique, the method according to the invention clearly distinguishes from the approach a skilled person in the art would take. The skilled person would render multiple views, i.e. different images to be directed to the various mutually different angular directions, and would then low-pass these different views afterwards. That is a straightforward, simple and more computer friendly approach. However, the image quality, in particular the sharpness of the different views would be less high compared to the method according to the invention. The filtering would be depth independent in that case. That means that even objects, which are to be displayed in the first plane (or relatively close to the first plane) would be blurred.

In an embodiment of the method according to the invention, a first difference between the first one of the angular directions and the further angular direction is substantially equal to a second difference between the first one of the angular directions and a second one of the angular directions. Preferably, the second difference corresponds to the minimum of mutual differences of the set of mutual differences between the angular directions. In other words, preferably the further angular direction corresponds to a second one of the angular directions, whereby the second one of the angular directions from all angular directions in which the display apparatus is designed to direct the outputs, deviates minimal from the first one of the angular directions. If the first difference is smaller than the second difference good results are achieved too.

In an embodiment of the method according to the invention, for determining the first intermediate value the first one of the angular directions is applied. The fact that the first intermediate value is determined "on basis of" a first one of the angular directions does not mean that the exact first one of the angular directions is applied, i.e. the applied angular direction may deviate from the first one of the angular directions which is directly determined by the physical dimensions of the optical directory elements, e.g. lenses, and the position of the first one of the picture elements relative to the optical axis of the optical directory elements.

In an embodiment of the method according to the invention, the further angular direction corresponds to a second one of the angular directions, the first one of the angular directions determined by a first spatial position of the first one of the picture elements relative to its associated first one of the optical directory elements, the second one of the angular directions determined by a second spatial position of a second one of the picture elements relative to its associated second one of the optical directory elements. As said, the stereoscopic display apparatus is designed to direct the outputs of the picture elements in mutually different angular directions relative to the first plane. For example, there are fourteen different angular directions. The layout of the stereoscopic display apparatus, i.e. the alignment of the laterally separated picture elements and the optical directory means comprising the optical directory elements determines the fourteen different angular directions. A portion of the set of fourteen different angular directions is associated to a first one of the optical directory elements. A second portion of the set of fourteen different angular directions is associated to a second one of the optical directory elements and a third portion of the set of fourteen different angular directions is associated to a third one of the optical directory elements. Preferably, the different angular directions used to compute the display value correspond to the different portions of the set of fourteen different angular directions.

An embodiment of the method according to the invention, comprises determining a third intermediate value from the 3-D representation on basis of a second further angular direction relative to the first plane and the coordinates of the first one of the picture elements; and combining the first intermediate value, the second intermediate value and the third intermediate value to the display value.

Preferably, the display value is based on more than two intermediate values, e.g. three. However with more than three intermediate values good results are achieved too. The conditions as specified above, e.g. related to the difference between angular directions and the portions of the set of angular directions also apply if the number of intermediate values is higher than two.

In an embodiment of the method according to the invention, combining comprises computing an average of the first intermediate value the second intermediate value and optionally the third intermediate value to compute the display value. Preferably, computing the average comprises computing a weighted average. The first intermediate value preferably has the highest weighting vector.

It is a further object of the invention to provide a stereoscopic display apparatus of the kind described in the opening paragraph whereby the occurrence of these so-called jagged edges is at least partly prevented.

This object of the invention is achieved in that the display apparatus further comprises:

first determining means for determining a first intermediate value from a 3-D representation on basis of a first one of the angular directions and coordinates of a first one of the picture elements;

second determining means for determining a second intermediate value from the 3-D representation on basis of a further angular direction relative to the first plane and the coordinates of the first one of the picture elements;

combining means for combining the first intermediate value and the second intermediate value to a display value; and providing means for providing the display value to the first one of the picture elements to generate its output.

It is a further object of the invention to provide a computer program product of the kind described in the opening paragraph whereby the occurrence of these so-called jagged edges is at least partly prevented.

This object of the invention is achieved in that the computer program product, after being loaded, provides said processing means with the capability to carry out:

determining a first intermediate value from a 3-D representation on basis of a first one of the angular directions and coordinates of a first one of the picture elements;

determining a second intermediate value from the 3-D representation on basis of a further angular direction relative to the first plane and the coordinates of the first one of the picture elements; and combining the first intermediate value and the second intermediate value to the display value, the display value related to the particular output of the first one of the picture elements.

Modifications of the method and variations thereof may correspond to modifications and variations thereof of the stereoscopic display apparatus and the computer program product, being described.

Figure 2:
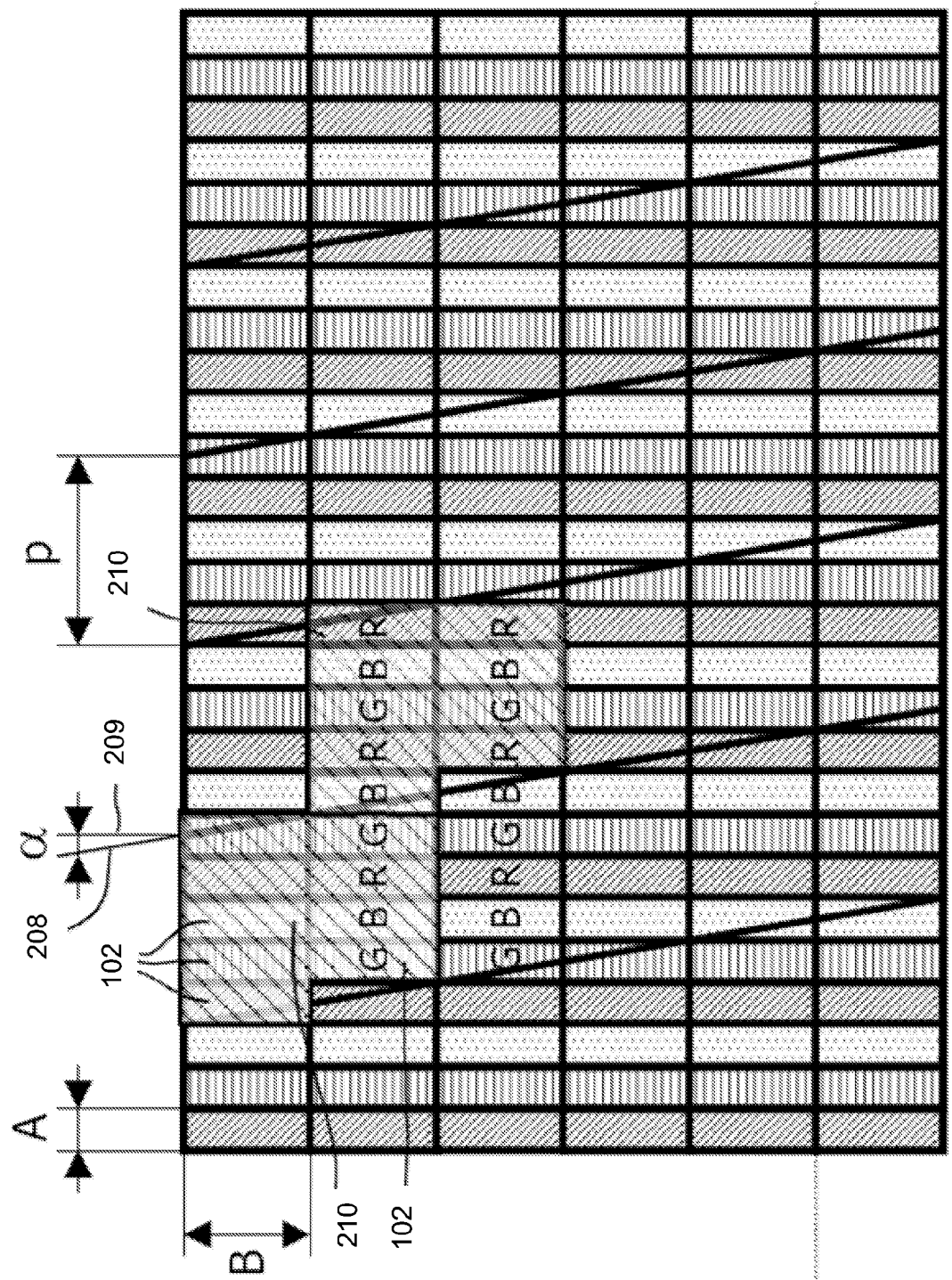
Figure 3:
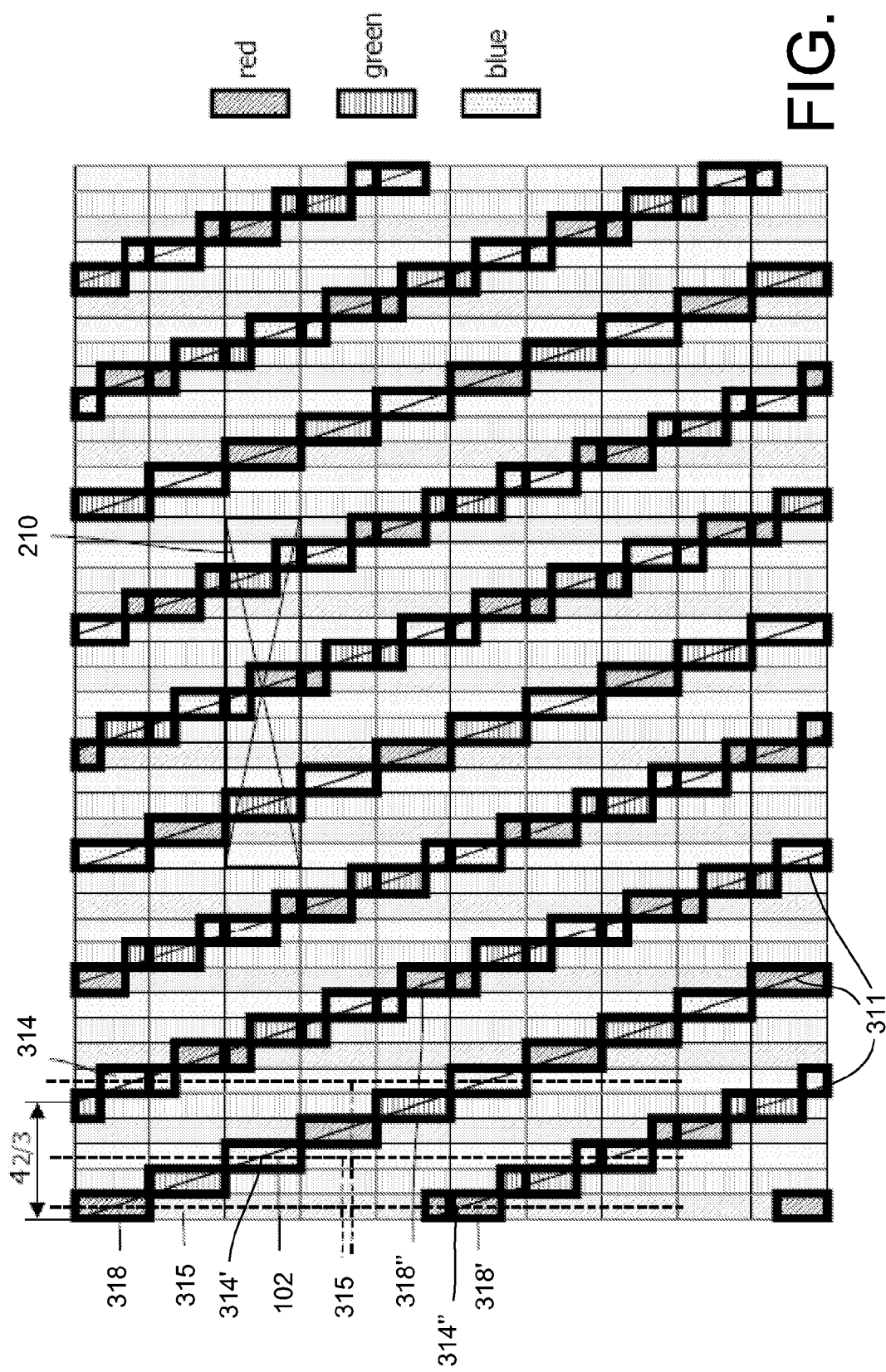
Figure 4:
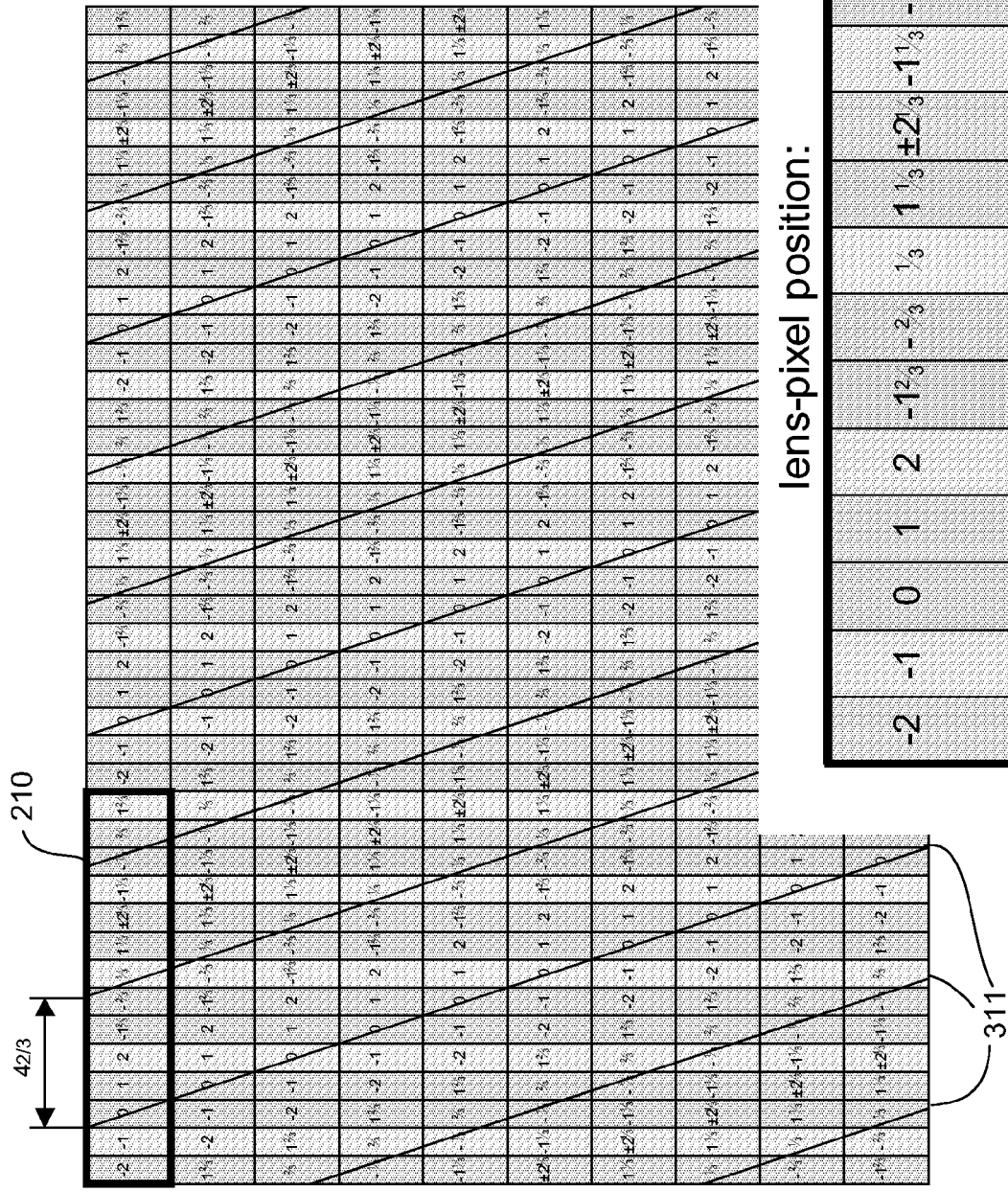
Figure 5:
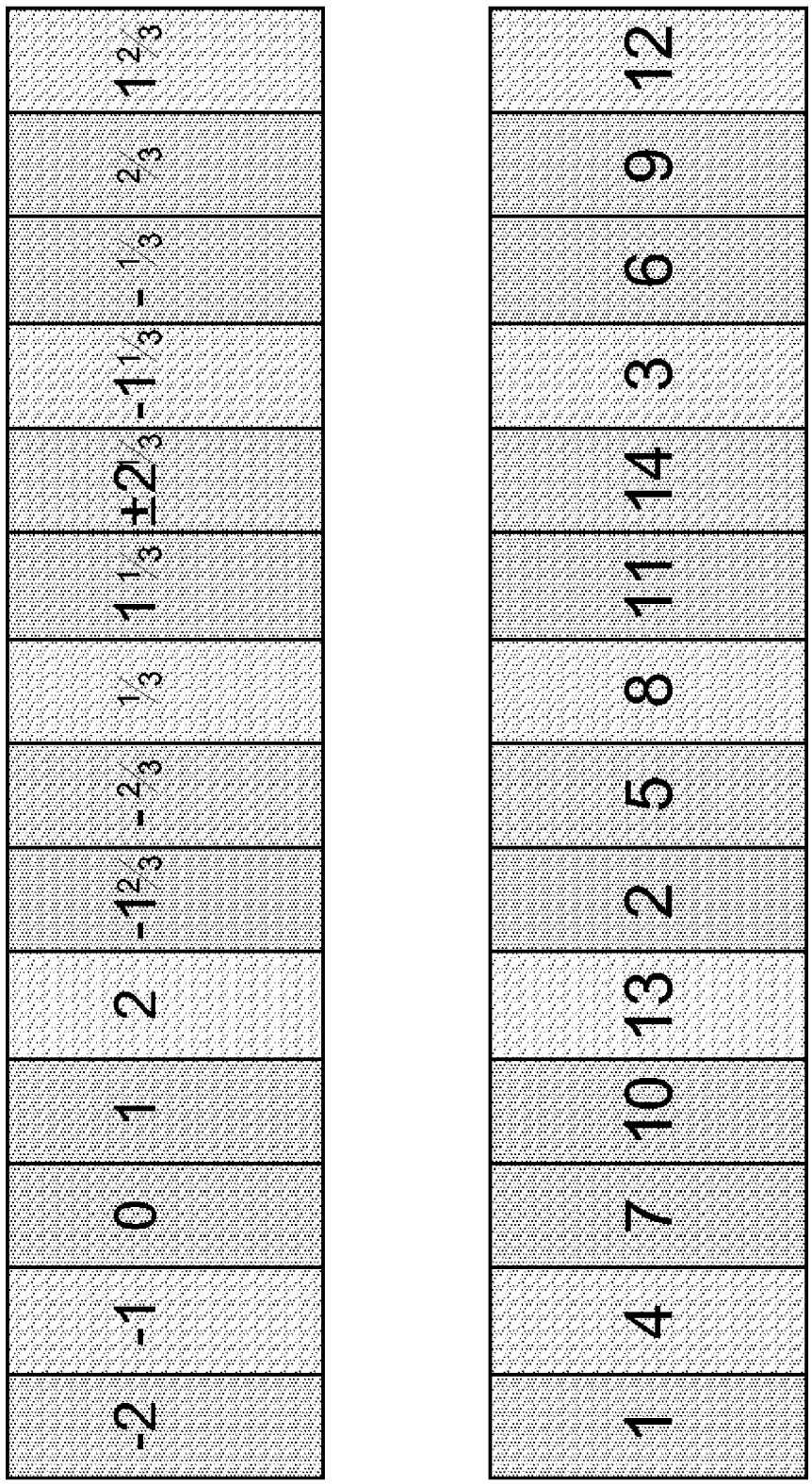
Figure 6:
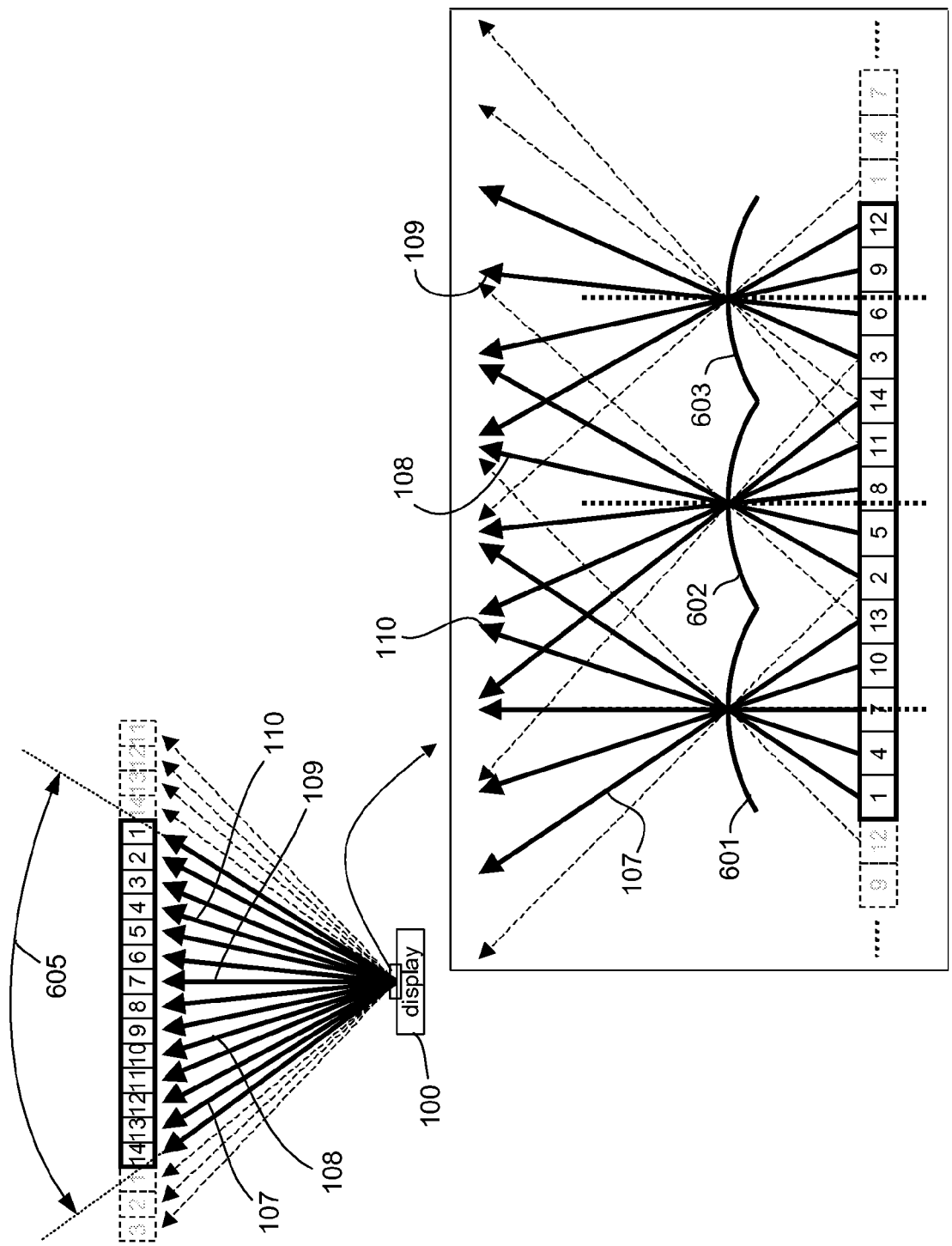
Figure 7:
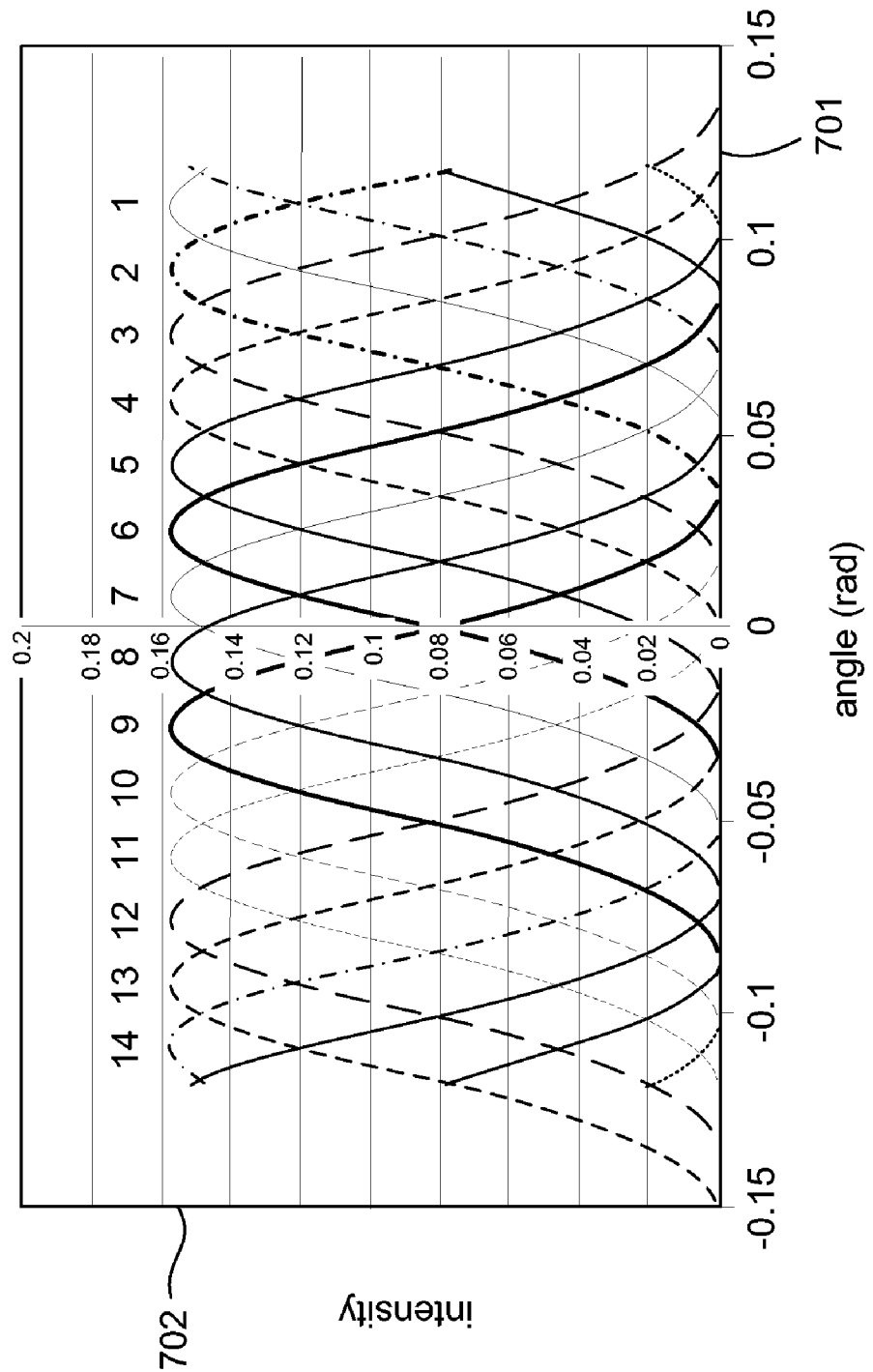
Figure 8:
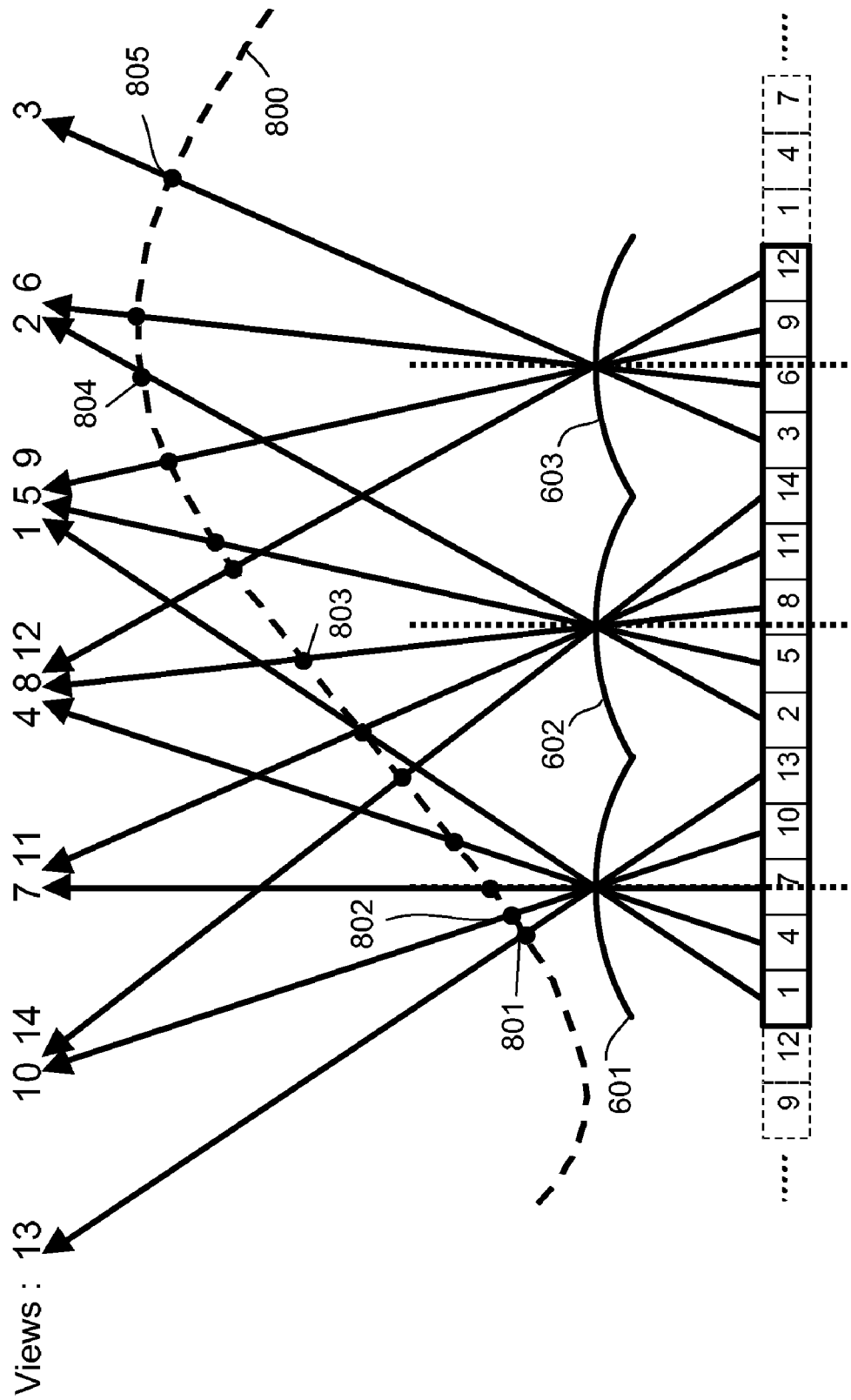
Figure 9:
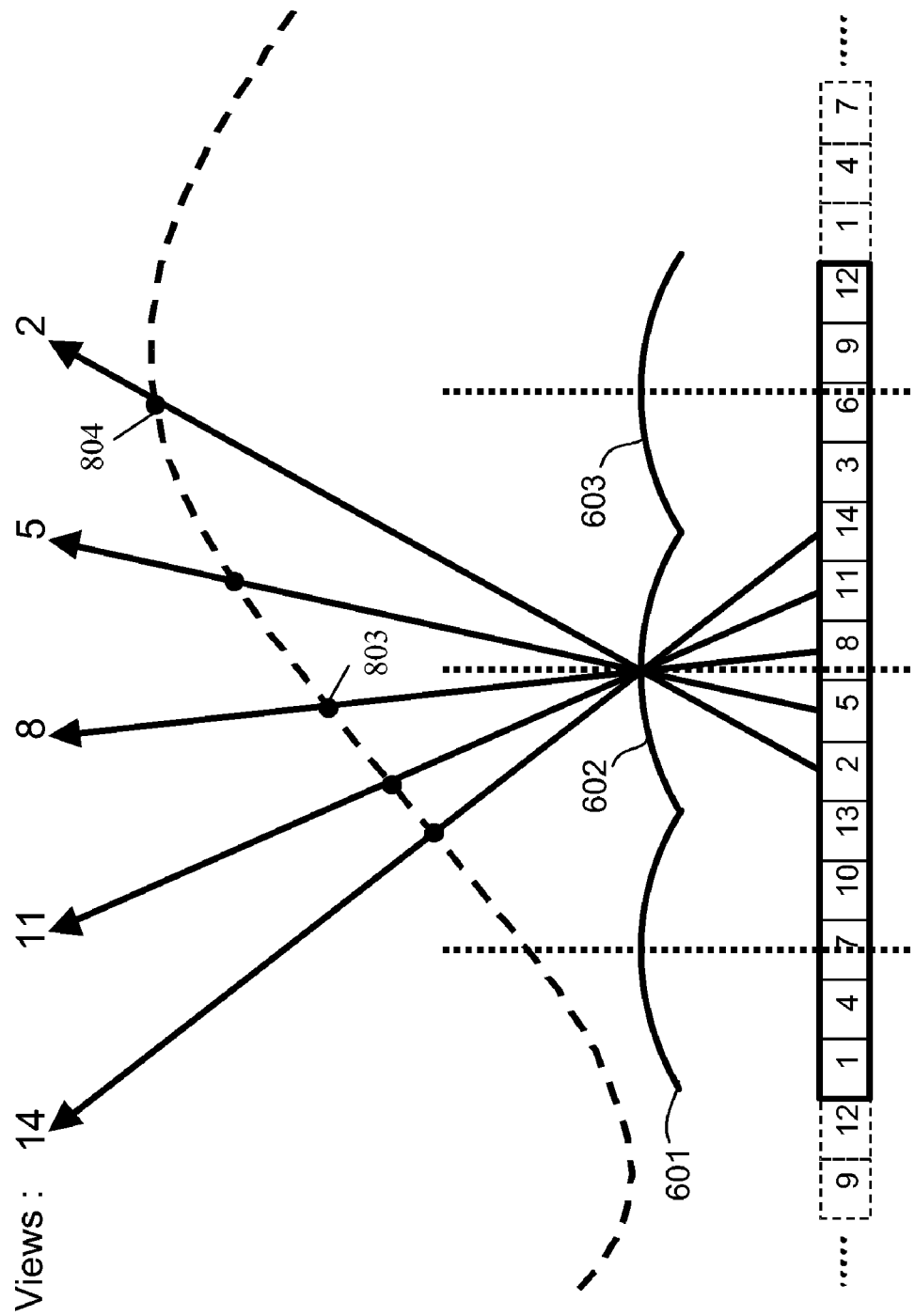
Figure 10:
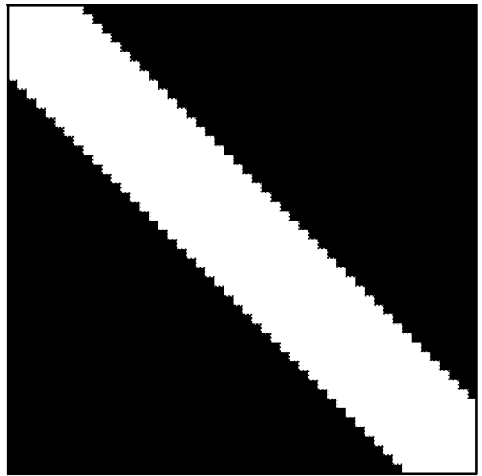
Figure 10:
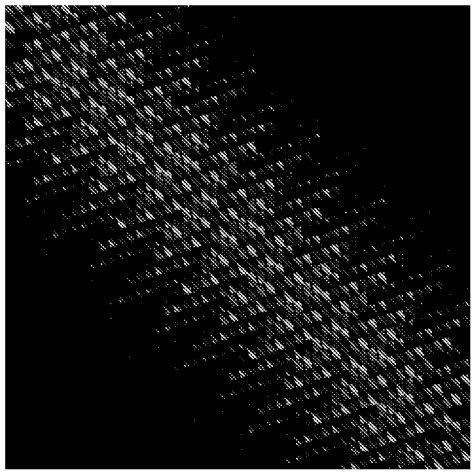
Figure 10:
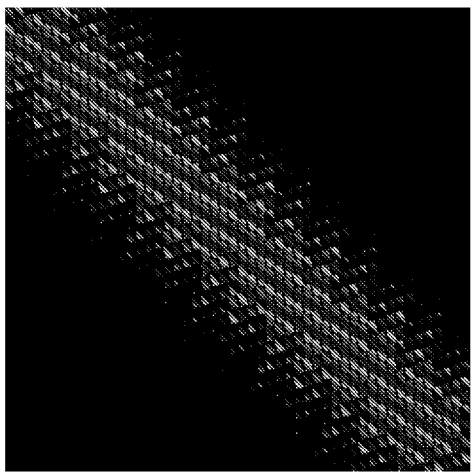
Figure 10:
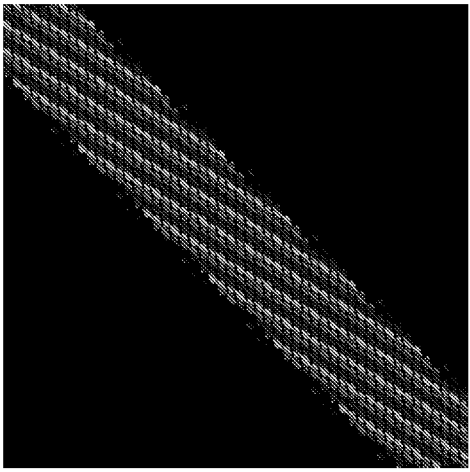
Figure 11:
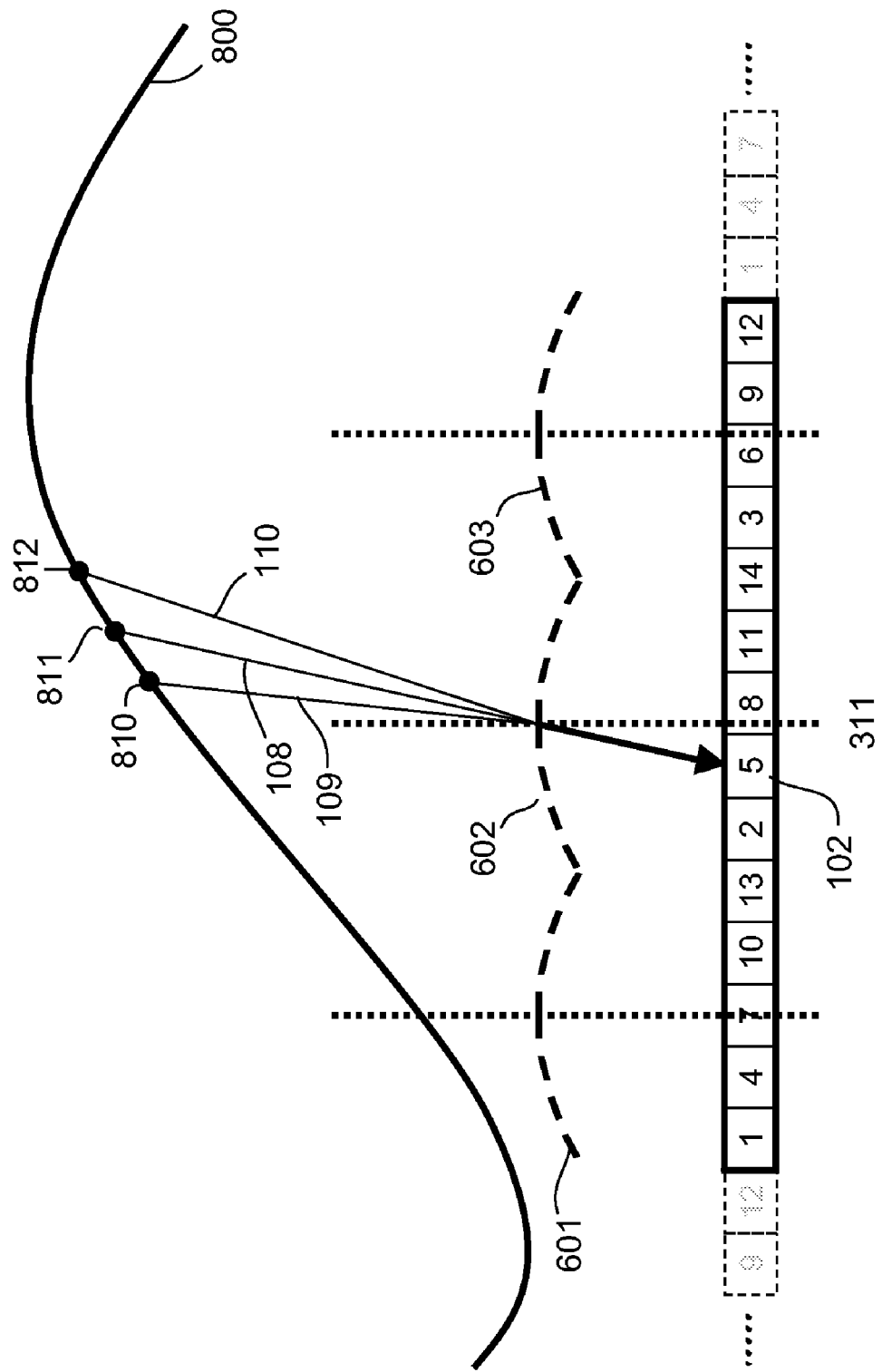
Figure 12:
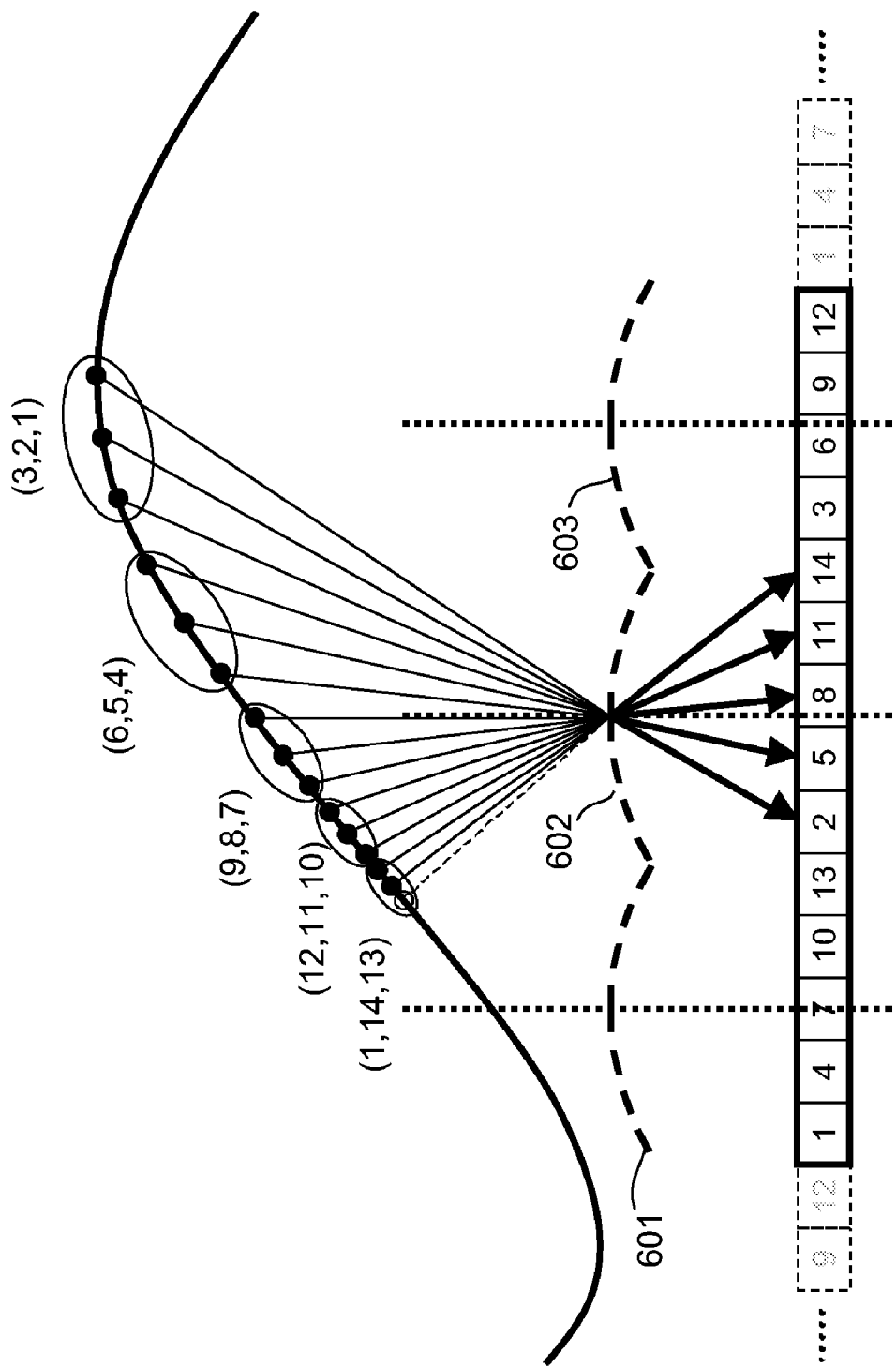
Figure 13:
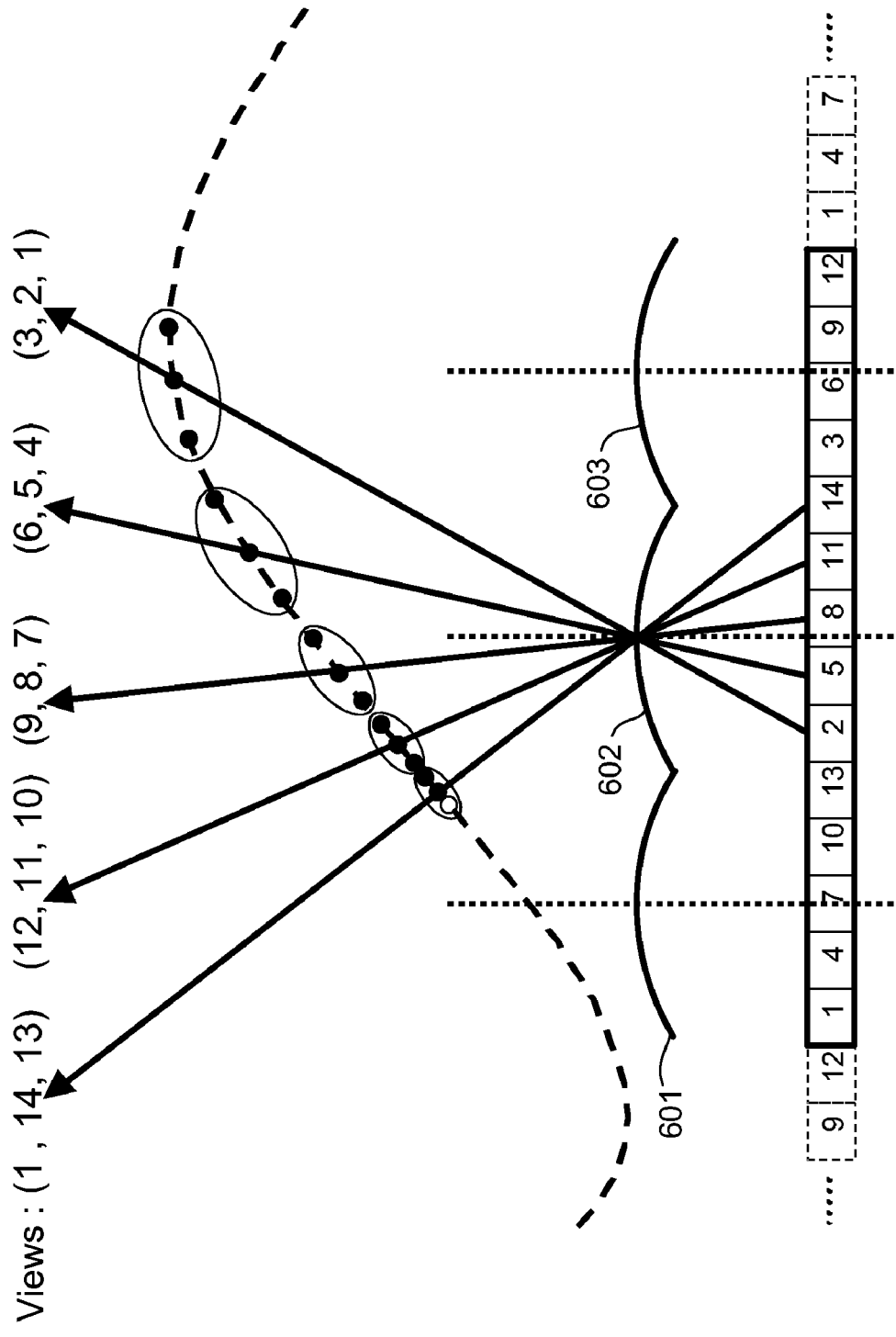
Figure 14:
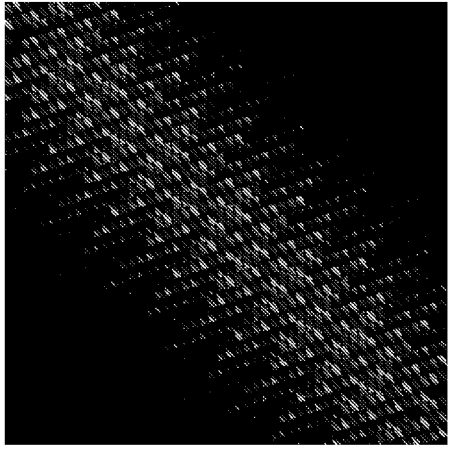
Figure 14:
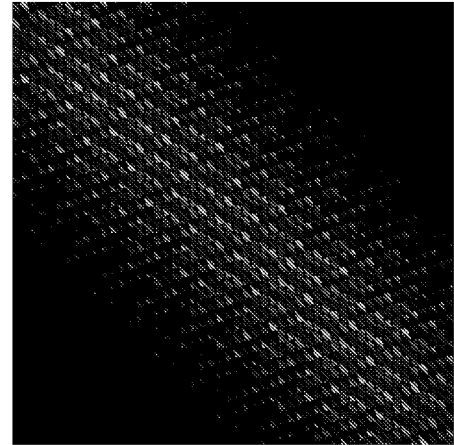
Figure 14:
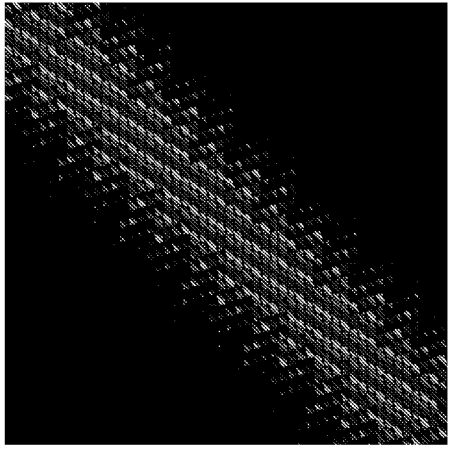
Figure 14:
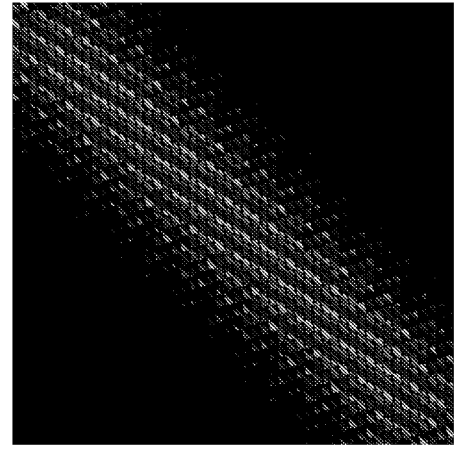
Figure 14:
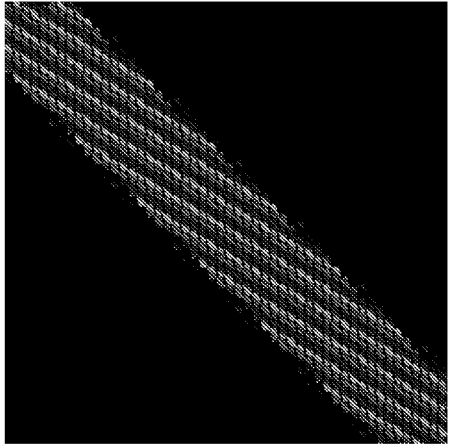
Figure 14:
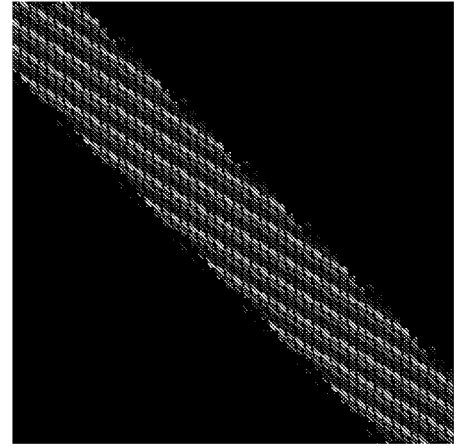
Figure 15:
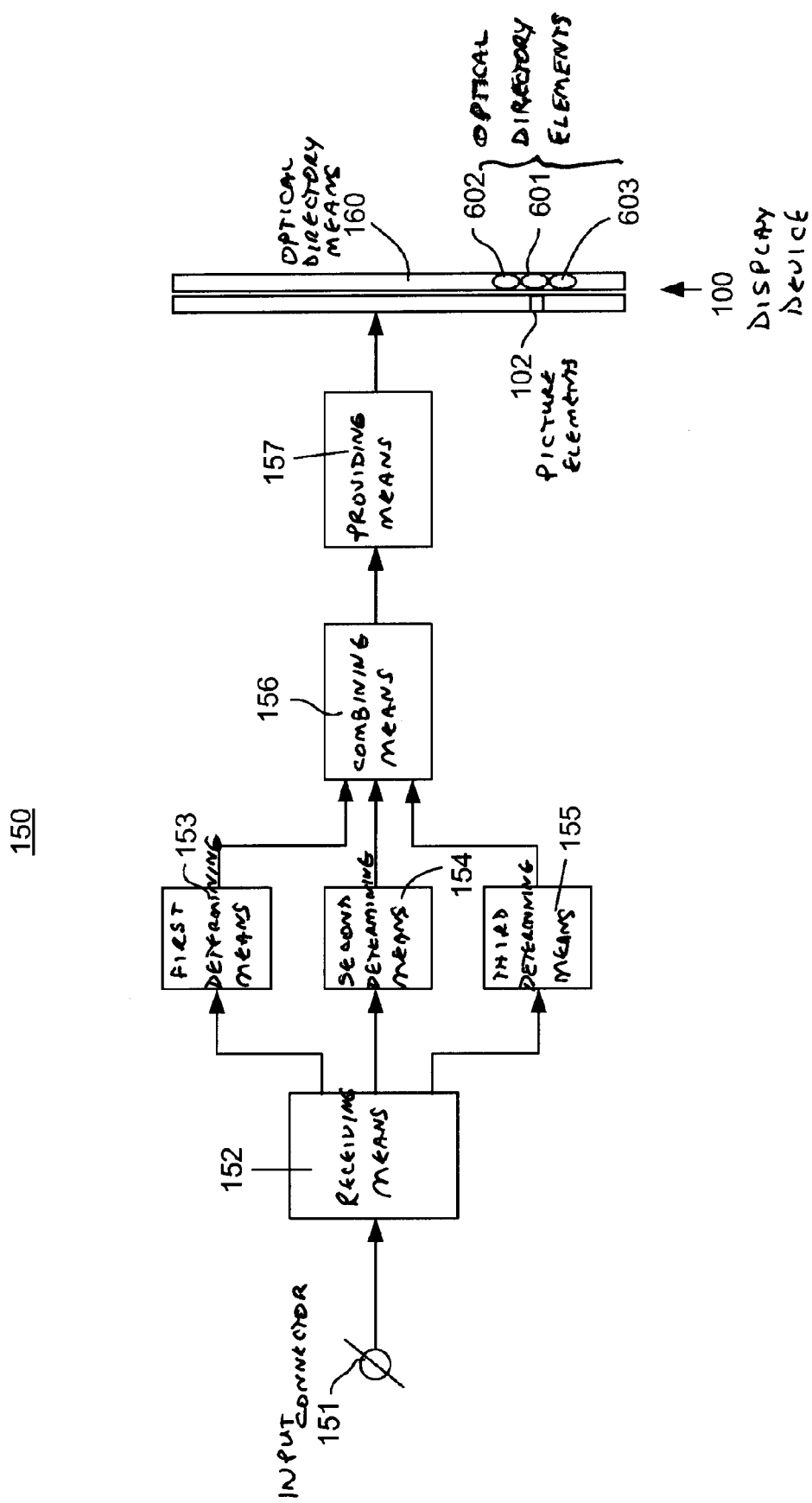

These and other aspects of the stereoscopic display apparatus, of the method and of the computer program product, according to the invention will become apparent from and will be elucidated with respect to the implementations and embodiments described hereinafter and with reference to the accompanying drawings, wherein:

FIG. 1 schematically shows a part of a display device;

FIG. 2 schematically shows a plan view of a part of the display device of FIG. 1;

FIG. 3 schematically shows a display device of the stereoscopic display apparatus according to the invention, having a 4⅔ views layout;

FIG. 4 schematically shows a so-called view mapping of the 4⅔ views layout of FIG. 3;

FIG. 5 schematically shows the corresponding view numbering of the 4⅔ views layout of FIG. 3;

FIG. 6 schematically shows how the views are arranged in the angular domain and how they correspond to the lens/pixel structure;

FIG. 7 schematically shows the angular intensity distribution of the cones;

FIG. 8 schematically shows the reconstruction of an object by the stereoscopic display apparatus according to the invention;

FIG. 9 schematically shows the rays emerging from the central lenticular;

FIG. 10 shows the simulated images of a slanted white bar, which is denoted as input image;

FIG. 11 schematically shows an example of filtering of the 3-D representation in the angular domain, according to the method of the invention;

FIG. 12 schematically shows the computation of display values for a number of picture elements associated with one of the optical directory elements;

FIG. 13 schematically shows that by filtering of the 3-D representation according to the method of the invention, individual lenses emit the information of all viewing angles;

FIG. 14 shows simulations of the slanted white bar with rendering according to the prior art, and with improved rendering according to the invention; and FIG. 15 schematically shows a stereoscopic display apparatus according to the invention.

The Figures are diagrammatic and not to scale. Same reference numerals are used to denote similar parts throughout the Figures.

FIG. 1 shows a schematic cross-sectional view of a part of a display device 100 having laterally separated picture elements 102 in a first plane 103. The device 100 has optical directory means, in this example a group of lenses (lenticulars) 601-603, each of which is associated with a group of picture elements 102. The lenses 601-603 cover the picture elements 102 in the first plane 103 for directing the outputs of the picture elements in mutually different angular directions. In this example the lenses are provided on a separate plate 105 in front of the display device 100, with the curved side facing the picture elements. The angular directions are indicated by means of arrows 107-109. The tangent of the angle $\alpha$ that the axes of the lenticulars (indicated by projected lines 208) make with the vertical axis 209 is $1/6$ (see FIG. 2, which shows a diagram in the direction perpendicular to the display device). Hence, in this particular case $\alpha = a\tan(1/6)$, which can be positive or negative. The lenticulars are slanted to improve the perceived picture element structure. The pitch p of the lenses is essentially such that the distance between the lenses measured in the horizontal direction equals 4.5 times the sub-picture element pitch A, i.e. $p = 4.5 * A/\cos(\alpha)$. This results in a $2*4.5 = 9$ views display. Areas 210 denote repeating zones of sub-pixels, each attributing to independent views.

The index of refraction of the display front panel 106 and the index of refraction of lenses is chosen n=1.5. Furthermore, the lens bodies in this example are (parts of) cylinders.

When moving in front of the display a modulation (dark bands) is clearly visible, although the modulation depth is only in the order of 1% (rms). The modulation is caused by the fact that different positions on the display correspond to different viewing angles. These in turn correspond to slightly different intensities due to different black matrix components in the light output, caused by e.g. a black matrix in certain (liquid crystal) displays. The bands move and change their pitch as the viewer moves in front of the display.

FIG. 3 schematically shows a display device of the stereoscopic display apparatus according to the invention. FIG. 3 shows an embodiment of the invention as disclosed in the application filed on Apr. 29, 2005 at the European patent office with application number 05103555.8. having a $4\frac{2}{3}$ views layout in which the pixel mapping of a pixel view simultaneously contains three different types of virtual sub-pixels, viz. "full" (virtual) sub-pixels 102, 318, "$1/3$ halfway" (virtual) sub-pixels 318' and "$2/3$ halfway" (virtual) sub-pixels 318". Areas 210 now denote repeating zones of fourteen sub-pixels, now each attributing to fourteen independent views. In this case not only the first harmonic, but also the second harmonic cancels out in the total intensity. Generally, larger denominators result in the cancellation of correspondingly larger harmonics, but also to a larger "wavelength" of the column-to-column modulation. A too long wavelength may result in visible structures, which is preferably avoided, so preferably the denominator is kept below 5 or 6. It is noted that the projection lines of the optical axis 311 and the centerlines 315 have their crossings always at different places, viz crossings 314 always at the center of a sub-pixel 2, 18 and crossings 314' always at the center of a sub-pixel 2, 18 at $1/3$ of the height of a sub-pixel and crossings 314" always at the center of a sub-pixel 2, 18 at $2/3$ of the height of a sub-pixel. The numbers of crossings 314 and crossings 314' is substantially equal for a certain display area.

FIG. 4 shows a so-called view mapping of the $4\frac{2}{3}$ views layout of FIG. 3. The numbers in the sub-pixels correspond to the horizontal distance from the center of the sub-pixel to nearest lens axis, measured in units of horizontal sub-pixel pitch. These numbers are a measure for the emission angle of the corresponding view, i.e. the angular directions. For views close to the display normal these numbers are roughly proportional to the emission angle. The $4\frac{2}{3}$ views in this layout in fact corresponds to $3 \times 4\frac{2}{3} = 14$ different views or viewing angles, i.e. emission angles. For reasons of readability a portion 210 of the layout is, indicated with the box is depicted enlarged at the bottom of FIG. 4.

FIG. 5 schematically shows the corresponding view numbering of the $4\frac{2}{3}$ views layout of FIG. 3. For example view number 1 corresponds to a horizontal distance from the center of the sub-pixel to the nearest lens axis of $-2$, view number 4 corresponds to a horizontal distance from the center of the sub-pixel to the nearest lens axis of $-1$, view number 7 corresponds to a horizontal distance from the center of the sub-pixel to the nearest lens axis of 0, etc. It is directly clear that subsequent views are not mapped to adjacent picture elements. A further inspection reveals that increasing distances from the centers of the sub-pixel to the nearest lens axis correspond to subsequent view numbers: view number 1 is mapped to the distance $-2$, view number 2 is mapped to distance $-1\frac{2}{3}$, view number 3 is mapped to distance $-1\frac{1}{3}$, view number 4 is mapped to distance $-1$, view number 5 is mapped to distance $-\frac{2}{3}$, etc. Notice that the distances are related to different optical directory elements (lenses).

FIG. 6 schematically shows how the views 1-14 are arranged in the angular domain and how they correspond to the lens/pixel structure. The upper left corner of FIG. 6 schematically depicts that the display device 100 is arranged to direct the output of the picture elements 102 into the angular directions of the set of angular directions together forming a cone 605 of the display device 100. The angular directions are indicated by means of arrows 107-110. The lower part of FIG. 6 shows the mapping of angular directions to the picture elements.

The portion of the set of angular directions comprising the angular directions corresponding to views 1,4,7,10,13, together called the first group, which are associated to a first one of the optical directory elements 601 together forms a first sub-cone. The portion of the set of angular directions comprising the angular directions corresponding to views 2,5,8, 11,14, together called the second group, which are associated to a second one of the optical directory elements 602 together forms a second sub-cone. The portion of the set of angular directions comprising the angular directions corresponding to views 3,6,9,12 together called the third group, which are associated to a third one of the optical directory elements 603 together forms a third sub-cone. Note that the sub-cones belonging to the neighboring optical directory elements 601-603 are slightly rotated from one optical directory element to the other.

FIG. 7 schematically shows the angular light intensity distribution of the views 1-14. The horizontal axis 701 of FIG. 7 represents the angle relative to the normal of the display device 100. The vertical axis of FIG. 7 represents the intensity of the light being directed by the optical directory elements on basis of the light being generated by the associated picture elements. Each distribution, i.e. the amount of light as function of the angle has a Gaussian shape. The maximum light intensity for each of the views corresponds to the respective angular direction. A very substantial overlap exists between subsequent views, meaning that light corresponding to a particular view mixes with light corresponding to its subsequent view.

FIG. 8 schematically shows the reconstruction of an object 800 by the stereoscopic display apparatus according to the invention. In other words, FIG. 8 schematically shows how an object 800 comprised in the 3-D representation, is rendered by the stereoscopic display apparatus. The different portions 801-805 of the object 800 are visualized by respective picture elements and the associated light directory elements 601-603. For instance a portion of the object 800 indicated with reference number 801 is visualized by means of a picture element corresponding to view 13, a portion of the object 800 indicated with reference number 802 is visualized by means of a picture element corresponding to view 10, a portion of the object 800 indicated with reference number 803 is visualized by means of a picture element corresponding to view 8, a portion of the object 800 indicated with reference number 804 is visualized by means of a picture element corresponding to view 2, and a portion of the object 800 indicated with reference number 805 is visualized by means of a picture element corresponding to view 3.

FIG. 9 schematically shows the light rays emerging from the central lenticular, i.e. the second one of the optical directory elements 602. The difference between FIG. 8 and FIG. 9 is that FIG. 9 does not show the light rays emerging from the neighboring optical directory elements 601 and 603. Only views 2, 5, 8, 11 and 14, i.e. belonging to the second group are displayed towards the viewer by the second sub-cone (centered around the normal of the display device 100). Each sub-cone is rotated slightly off-normal with a certain angular offset. The angular offset is different for the three directory elements 601-603 shown in FIG. 8. This position dependent angular offset causes the jagged edge artifacts, which are substantially prevented by the method according to the invention.

The jagged edge artifacts are shown in FIG. 10. FIG. 10 shows the simulated output on basis of a slanted white bar, which is depicted in the right upper corner of FIG. 10 and which is denoted as "input image". The lower pictures show the images that a viewer would perceive on a display device 100 as described in connection with FIGS. 3 and 4 if prior art rendering would have been applied. The viewer would perceive the lower pictures if he was looking at the display device 100 with a single eye perpendicular to the display device 100, for the case that the bar was positioned in the first plane of the display device (disparity=0), and for the cases that the bar was positioned in front of the display with a disparity of 2 and 4 (RGB triplet) pixels per view, respectively. The latter two pictures clearly show the jagged edge artifact. The "jaggedness" increases linearly with the depth/disparity of the object.

FIG. 11 schematically shows an example of filtering of the 3-D representation in the angular domain, according to the method of the invention. By applying a dedicated filtering/sampling of the content, i.e. 3-D representation, in the angular domain the jagged edge artifacts are substantially prevented. The method according to the invention preferably comprises:

determining a first intermediate value 811 from a 3-D representation on basis of a first one of the angular directions 108 and coordinates of a first one of the picture elements 102;

determining a second intermediate value 810 from the 3-D representation on basis of a second one of the angular directions 109 and the coordinates of the first one of the picture elements 102;

determining a third intermediate value 812 from the 3-D representation on basis of a third one of the angular directions 110 and the coordinates of the first one of the picture elements 102; and combining the first intermediate value 811, the second intermediate value 810 and the third intermediate value 812 into the display value, the display value related to the particular output of the first one of the picture elements 102.

In FIG. 11 an example of computing a display value to be applied to the first one of the picture elements 102 is schematically shown. The first one of the picture elements 102 belongs to view 5, i.e. the output of the first one of the picture elements 102 is to be directed by the associated second one of the optical directory elements 602 in the particular angular direction corresponding to view 5. For the computation of the display value for the first one of the picture elements 102 the first fetch angle is substantially equal to the particular angular direction corresponding to view 5. In other words, for fetching the first intermediate value 811 from the 3-D representation, the first fetch angle, i.e. the angle, relative to the coordinate system of the 3-D representation, for fetching the first intermediate value 811 is substantially equal to the angle of eventual light emission by the first one of the picture elements 102. Besides the appropriate first fetch angle, the correct starting point in the 3-D representation is relevant. That starting point is based on the coordinates of the first one of the picture elements 102. Preferably, the starting point is determined by the optical axis of the optical directory element which is associated with the first one of the picture elements 102, i.e. the second one of the optical directory elements 602.

However, the display value is also based on (in this case) two additional intermediate values, i.e. the second intermediate value 810 and the third intermediate value 812. The second intermediate value 810 and the third intermediate value 812 are fetched from the 3-D representation by applying a second fetch angle and a third fetch angle, respectively. Preferably, the second fetch angle is substantially equal to the second one of the angular directions 109, which corresponds to view 6. Preferably, the third fetch angle is substantially equal to the third one of the angular directions 110, which corresponds to view 4. Notice that views 4 and 6 are in number adjacent to view 5, meaning that the differences between horizontal distances, as described in connection with FIG. 5, are minimal and also the mutual difference between angular directions, as described in connection with FIGS. 6 and 7 is minimal. Notice that view 4 and view 6 are associated with other optical directory elements than view 5 is associated. View 4 is associated with the first one of the optical directory elements 601 and view 6 is associated with the third one of the optical directory elements 603.

For determining the second intermediate value 810 and the third intermediate value 812 the same starting point is applied as being applied for determining the first intermediate value 811.

After determining the first intermediate value 811, the second intermediate value 810 and the third intermediate value 812 these three values are combined into the display value. Preferably, combining means computing the average of the three intermediate values 810-812. Preferably, a weighted average is computed whereby the contribution of the first intermediate value 811 is higher than the contribution of the second intermediate value 810 and the third intermediate value 812.

FIG. 12 schematically shows the computation of display values for a number of picture elements associated with the second one of the optical directory elements 601. FIG. 12 schematically illustrates that information is fetched on basis of all fourteen different angular directions for the five (actually 4⅔) pixels associated with the second one of the optical directory elements 601. By applying the method according to the invention, the effect will be in that each individual optical directory element emits information of all different angular directions of the display device 100, thereby effectively removing the entanglement of viewing angle and (3D-) picture element position.

FIG. 13 schematically shows that by filtering of the 3-D representation according to the method of the invention, individual optical directory elements, i.e. lenses emit the information of all different angular directions into which the display device 100 is arranged to emit light.

FIG. 14 shows simulations of the slanted white bar (See also FIG. 10) with rendering according to the prior art, and with improved rendering according to the invention. The pictures in the upper row correspond with rendering according to the prior art. These pictures are equal to the pictures as shown in FIG. 10. The pictures in the lower row correspond with rendering according to the invention. The filtering, i.e. computing the display values by taking into account multiple intermediate values by applying respective fetch angles, clearly removes the jagged edge artifacts.

FIG. 15 schematically shows a stereoscopic display apparatus according to the invention. The stereoscopic display apparatus comprises:
 receiving means 152 for receiving a signal comprising a 3-D representation which is provided to the stereoscopic display apparatus at the input connector 151. Preferably the receiving means comprises a storage device for temporarily storage of a portion of the signal. The signal may be a broadcast signal received via an antenna or cable but may also be a signal from a storage device like a VCR (Video Cassette Recorder) or optical disk like Digital Versatile Disk (DVD);
 a display device 100 for producing a display, as described in connection with FIGS. 1-7.
 processing means 153-156 for computing display values on basis of the 3-D representation; and
 providing means 157 for providing the display values the to picture elements 102 of the display device 100 to generate light to be directed to mutually different angular directions by the optical directory means 160 of the display device 100. Typically the providing means 157 comprises a storage device for temporally storage of the display values for the total set of picture elements of the display device 100. Optionally, the providing means comprises an amplification unit and a synchronization unit.

The processing means comprises a number of determining means 153-155 for determining a respective number of intermediate values from the 3-D representation and a combining means 156 for combining the intermediate values 810-812 into display values. In FIG. 15 three of this determining means 153-155 are depicted:
 the first determining means 153 is arranged to determine a first intermediate value 811 from the 3-D representation on basis of a first fetch angle and coordinates of a first one of the picture elements 102;
 the second determining means 154 is arranged to determine a second intermediate value 810 from the 3-D representation on basis of a second fetch angle and the coordinates of the first one of the picture elements 102; and
 the third determining means 155 is arranged to determine a third intermediate value 812 from the 3-D representation on basis of a third fetch angle and coordinates of the first one of the picture elements 102.

Preferably, the first fetch angle, the second fetch angle and the third fetch angle are based on the physical layout of the display device 100. The layout of the display device 100, in particular the position of the picture elements 102 relative to the associated optical directory elements 601-603 is such that the light being generated by the picture elements is primarily directed in predetermined angular directions. It is preferred that the first fetch angle, the second fetch angle and the third fetch angle are substantially equal to respective predetermined angular directions of the display device 100.

The coordinates of the picture elements are used as starting points for fetching the intermediate values from the 3-D representation as explained in connection with FIG. 11.

The first determining means 153, the second determining means 154, the third determining means 155 and the combining means 156 may be implemented using one processor. Normally, these functions are performed under control of a software program product. During execution, normally the software program product is loaded into a memory, like a RAM, and executed from there. The program may be loaded from a background memory, like a ROM, hard disk, or magnetical and/or optical storage, or may be loaded via a network like Internet. Optionally an application specific integrated circuit provides the disclosed functionality.

The computer program product according to the invention can be loaded into a computing machine, the computing machine comprising processing means and a memory, in order to provide said processing means with the capability to carry out the processing of the method according to the invention. A single processing unit or a plurality of processing units can be controlled by the computer program product to achieve the results according to the invention.

The computer program product can be handled in a standard comprised or detachable storage, for example a flash memory or a compact disk or a hard disk. The computer program product can be embedded in a computing machine as embedded software or kept pre-loaded or loaded from one of the standard memory devices. The computer program product can be designed in any of the known codes such as machine language code or assembly language code and made to operate on any of the available platforms such as personal computers or servers.

The computer program product can be stored inside the apparatus or carried in a detachable storage medium such as an optical storage disc and transferred to the apparatus. The computer program product can be used in various forms of consumer apparatus for example, set top box, video receiver, video recorder/player, hand-held mobile communication or entertainment devices. The computer program product can be implemented on various platforms such as personal computers or signal processors.

In this specification the term 3-D representation is used. Typically the 3-D representation will be stored (digitally) with data elements according to a particular 3-D data format, which is based on a 3-D model. Below a not exhaustive list of types 3-D data formats is provided:

Wireframes, e.g. as specified for VRML. These models comprise a structure of lines and faces.

Volumetric data-structures or voxel maps (Voxel means volume element). These volumetric data-structures comprise a three-dimensional array of elements. Each element has three dimensions and represents a value of a property. E.g. CT (Computer tomography) data is stored as a volumetric data-structure in which each element corresponds to a respective Hounsfield value.

Two-dimensional image with depth map, e.g. a two-dimensional image with RGBD values. This means that each value comprises luminance, color and depth information.

Image based models, e.g. stereo image pairs or multi view images. These types of images are also called light fields.

The method, the computer program product and the stereoscopic display apparatus according to the invention can be applied with and is arranged to apply with, respectively, a 3-D representation being described with any of the above listed 3-D data formats.

Although in the examples a liquid crystal display is shown, the invention can also be used in other kinds of displays such as plasma, LED-displays, etcetera.

Instead of lenticular elements other optical directory elements such as barriers may be chosen alternatively.

Although in the examples a so-called view mapping of the 4⅔ views is shown, the invention can also be used in other kinds of mappings.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware or software. The usage of the words first, second and third, etcetera do not indicate any ordering. These words are to be interpreted as names.

The invention claimed is:

1. A method of computing a display value to be provided to a stereoscopic display apparatus comprising means for producing a display, the stereoscopic display apparatus comprising laterally separated picture elements in a first plane and optical directory means comprising a group of optical directory elements each of which is associated with a respective group of picture elements, the optical directory means overlying the picture elements in the first plane for directing the outputs of the picture elements in mutually different angular directions relative to the first plane, the method comprising:
   determining a first intermediate value from a 3-D representation on basis of a first one of the angular directions and coordinates of a first one of the picture elements;
   determining a second intermediate value from the 3-D representation on basis of a further angular direction relative to the first plane and the coordinates of the first one of the picture elements; and
   combining the first intermediate value and the second intermediate value to the display value, the display value related to the particular output of the first one of the picture elements;
   wherein the further angular direction corresponds to a second one of the angular directions, the first one of the angular directions determined by a first spatial position of the first one of the picture elements relative to its associated first one of the optical directory elements, the second one of the angular directions determined by a second spatial position of a second one of the picture elements relative to its associated second one of the optical directory elements.

2. A method as claimed in claim 1, wherein a first difference between the first one of the angular directions and the further angular direction is substantially equal to a second difference between the first one of the angular directions and a second one of the angular directions.

3. A method as claimed in claim 2, wherein the second difference corresponds to the minimum of mutual differences of the set of mutual differences between the angular directions.

4. A method as claimed in claim 1, wherein for determining the first intermediate value the first one of the angular directions is applied.

5. A method of computing a display value to be provided to a stereoscopic display apparatus comprising means for producing a display, the stereoscopic display apparatus comprising laterally separated picture elements in a first plane and optical directory means comprising a group of optical directory elements each of which is associated with a respective group of picture elements, the optical directory means overlying the picture elements in the first plane for directing the outputs of the picture elements in mutually different angular directions relative to the first plane, the method comprising:
   determining a first intermediate value from a 3-D representation on basis of a first one of the angular directions and coordinates of a first one of the picture elements;
   determining a second intermediate value from the 3-D representation on basis of a further angular direction relative to the first plane and the coordinates of the first one of the picture elements; and
   combining the first intermediate value and the second intermediate value to the display value, the display value related to the particular output of the first one of the picture elements;
   determining a third intermediate value from the 3-D representation on basis of a second further angular direction relative to the first plane and the coordinates of the first one of the picture elements; and
   combining the first intermediate value, the second intermediate value and the third intermediate value to the display value.

6. A method as claimed in claim 5, wherein combining comprises computing an average of the first intermediate value the second intermediate value and optionally the third intermediate value to compute the display value.

7. A method as claimed in claim 6, wherein computing the average comprises computing a weighted average.

8. A stereoscopic display apparatus comprising means for producing a display, the stereoscopic display apparatus comprising laterally separated picture elements in a first plane and optical directory means comprising a group of optical directory elements each of which is associated with a respective group of picture elements, the optical directory means overlying the picture elements in the first plane for directing the outputs of the picture elements in mutually different angular directions relative to the first plane, the display apparatus further comprising:

first determining means for determining a first intermediate value from a 3-D representation on basis of a first one of the angular directions and coordinates of a first one of the picture elements;

second determining means for determining a second intermediate value from the 3-D representation on basis of a further angular direction relative to the first plane and the coordinates of the first one of the picture elements;

third determining means for determining a third intermediate value from the 3-D representation on basis of a second further angular direction relative to the first plane and the coordinates of the first one of the picture elements;

combining means for combining the first intermediate value, the second intermediate value and the third intermediate value to a display value; and providing means for providing the display value to the first one of the picture elements to generate its output.

9. A computer program product, stored in a non-transitory computer readable medium, to be loaded by a computer arrangement, comprising instructions to compute a display value to be provided to a stereoscopic display apparatus comprising means for producing a display, the stereoscopic display apparatus comprising laterally separated picture elements in a first plane and optical directory means comprising a group of optical directory elements each of which is associated with a respective group of picture elements, the optical directory means overlying the picture elements in the first plane for directing the outputs of the picture elements in mutually different angular directions relative to the first plane, the computer arrangement comprising processing means and a memory, the computer program product, after being loaded, providing said processing means with the capability to carry out:

determining a first intermediate value from a 3-D representation on basis of a first one of the angular directions and coordinates of a first one of the picture elements;

determining a second intermediate value from the 3-D representation on basis of a further angular direction relative to the first plane and the coordinates of the first one of the picture elements;

determining a third intermediate value from the 3-D representation on basis of a second further angular direction relative to the first plane and the coordinates of the first one of the picture elements;

combining the first intermediate value, the second intermediate value and the third intermediate value to the display value, the display value related to the particular output of the first one of the picture elements.

\* \* \* \* \*